UNITED STATES PATENT OFFICE.

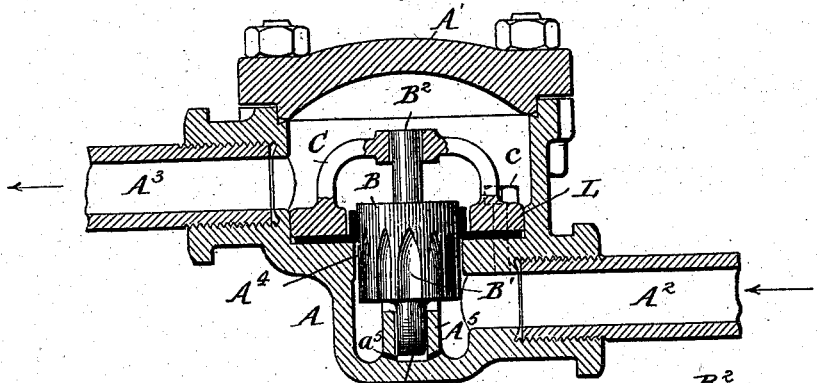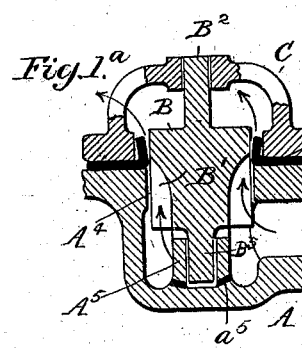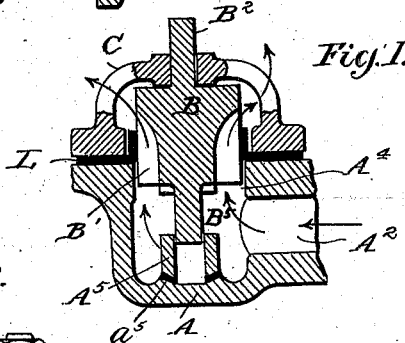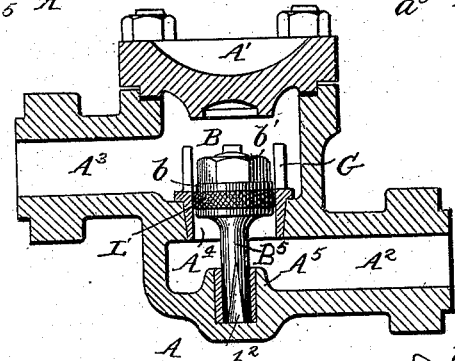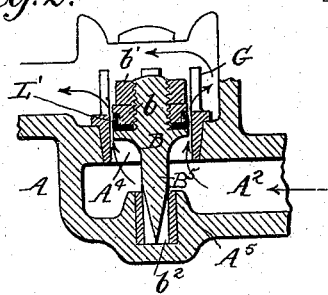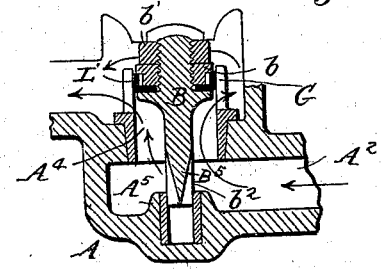

THOMAS E. BROWN, JR., AND ROBERT H. THORPE, OF NEW YORK, N. Y.

BALANCED CHECK-VALVE.

SPECIFICATION forming part of Letters Patent No. 558,034, dated April 14, 1896.

Application filed August 9, 1894. Serial No. 519,879. (No model.)

*To all whom it may concern:*

Be it known that we, THOMAS E. BROWN, Jr., a citizen of the United States, and ROBERT HENRY THORPE, a subject of the Queen of Great Britain, both residing in the city, county, and State of New York, have invented certain new and useful Improvements in Balanced Check-Valves, of which the following is a specification.

Our invention relates to balanced check-valves; and it has for its object to provide an improved check-valve which shall be simple in construction and which shall be perfectly tight when closed, and shall be so perfectly or so nearly balanced that the smallest increase of pressure from one side of the valve shall permit the flow of fluid without having to overcome any resistance due to the difference in area between the two sides of the valve; and, furthermore, the valve shall have the least possible friction and shall be capable of providing a partial opening through the valve before the valve itself moves, and the seating of the valve and the governing of its motion shall be absolutely independent of the function of making the valve perfectly tight; and to these ends our invention consists in a valve embodying the various features of construction and arrangements of parts having the mode of operation substantially as hereinafter more particularly set forth.

Referring to the accompanying drawings, wherein we have illustrated two embodiments of our invention, Figure 1 is a vertical section of a valve, showing the inlet and outlet pipe connected thereto. Figs. $1^a$ and $1^b$ are respectively vertical sections of sufficient of the valve device to illustrate its operation. Fig. 2 is a vertical section of another embodiment of our invention; and Figs. $2^a$ and $2^b$ are vertical sections of so much of the valve as is necessary to illustrate its mode of operation.

In carrying out our invention we provide a valve in which there is the least possible friction and in which, preferably, the opposite sides are of the same area, so as to form a balanced valve, and we also avoid friction in the movement of the valve and at the same time make a perfectly tight joint or closure of the valve, as well as permit the flow of water to a certain extent, without having to bodily move the valve, by the use of leathers, which embrace the valve proper and which are arranged substantially in the manner hereinafter set forth. These leathers may be of various shapes, according to the style and arrangement of the valve device—such as the cup, hat, U, or other form—and we have illustrated the use of two of such forms in the accompanying drawings.

Referring more particularly to Figs. 1, $1^a$, and $1^b$, A represents the valve-casing, having a cap A' and inlet and outlet connections $A^2$ $A^3$ and provided with a port $A^4$. Mounted in this port is the valve proper, B, which is arranged to move loosely in the port and which is provided with a stem, $B^5$, on which the valve rests when seated, and the end of which, or that part of it which comes into contact and rests upon the valve casing or body, is brought to a knife-edge. In the present instance the stem $B^5$ is shown as projecting into an extension $A^5$ of the valve-case, which extension is provided with holes $a^5$, permitting free access of fluid beneath the stem. As this seat has nothing whatever to do with the making tight of the valve, it may be brought to the finest degree practicable and thus offer the least friction and the least resistance to water getting underneath the same, and as the areas of the two sides of the valve are the same a perfect balance on both sides of the valve is obtained. In the present instance the valve-body is provided with a series of V-shaped openings or passages B', cut into the valve itself, which permit a clear waterway of large area as soon as the valve has moved to the proper position, as indicated in Fig. $1^b$. The valve is also provided with a stem or guide-piece $B^2$, which fits loosely in an opening in the cover C. This cover C regulates and limits the movement of the valve and is secured to the valve-body adjacent the port $A^4$ in any suitable way, as by screws or bolts c, and it is of course provided with holes or openings or made in a spider or skeleton form, as indicated, so as to permit the free passage of the fluid through the valve from the inlet to the outlet. The leather L in this instance is shown in the hat form, the rim of which is secured between the walls of the valve-casing and the cover C, adjacent the port A⁴, in the manner shown, while the body portion of the hat-leather bears on the outer surface of the valve-body B.

In Fig. 1 the valve is shown closed, and it may be presumed that the pressure of the fluid on the outlet side is greater than that on the inlet side, and the body of the hat-leather will be held closely against the body of the valve, making a perfectly-tight joint, permitting absolutely no passage of the fluid, and of course the greater the difference in pressure of the fluid on the two sides of the valve the tighter will the leather be held against the outer body of the valve. Suppose now that the pressure on the inlet side has become equal to that on the outlet side, or perhaps slightly greater, and it will be seen on reference to Fig. 1ª that the pressure has caused the body of the leather L to flop or turn backward or outward away from the body of the valve, thus allowing the fluid to pass, as indicated by the arrows, Fig. 1ª, and the pressure to be equalized on both sides of the valve without having caused the valve to rise. If now the difference of pressure between the inlet and outlet increases, the valve-body B is moved as indicated in Fig. 1ᵇ, completely opening the valve, permitting the free passage of fluid therethrough, and in order to do this the pressure of the fluid on the inlet side of the valve need only be sufficiently greater than the pressure on the outlet side to lift the weight of the valve itself, as there is no resistance to overcome due to the seat of the valve other than that which may be caused by the knife-edge of the stem B⁵, which is so small that it need not be taken into account, and it will further be seen that there is no friction or resistance to be overcome due to the pressure of the leathers on the valve, so that the movement of the valve may be said to be practically frictionless.

In Figs. 2, 2ª, and 2ᵇ we have shown another embodiment of our invention, whereby the same results are obtained in substantially the same manner, in which the valve B is provided with a cup-shaped leather L', which is secured to the valve-body by a collar $b$ and set-nut $b'$, the collar being recessed circumferentially to allow sufficient play of the upper edge of the leather. In this construction instead of the cover C being used, the cap-piece A' serves to limit the movement of the valve, and the port A⁴ is provided with the guides G, which extend upward therefrom to control the movement of the valve, in place of the stem B² in Fig. 1. Furthermore, the stem B⁵ is shown as fitting an extension or socket A⁵; but instead of the extension having the openings $a^5$, the stem is provided with V-shaped slots $b^2$, by means of which the fluid has free access beneath the stem, so as to produce the balance of the valve. As in Fig. 1, the valve is shown in Fig. 2 in its closed position, and it will be seen that any excess of pressure on the outlet side will tend to keep the leathers in close contact with the sides of the port, making a tight joint. When, however, the pressure on the inlet side of the valve is made equal to or slightly in excess of that on the outlet side, the action is as illustrated in Fig. 2ª, the leathers are pressed inward away from the port, allowing the passage of the fluid, and the smallest excess of pressure on the inlet side is sufficent to cause the leathers to bend inward, so that if the pressure is increased and the valve is caused to rise to the position indicated in Fig. 2ᵇ there will be no friction between the leathers and the guides, the only friction being due to the stem B⁵, which is, as before stated, practically nothing.

While we have thus described specifically two embodiments of our invention, it will be seen that the details of construction and arrangement of parts may be varied by those skilled in the art to suit the requirements of the case without departing from the spirit of our invention, and we therefore do not limit ourselves to the precise construction and arrangement shown.

It will be seen that our invention provides a very sensitive check-valve, in that the valve presents the same area of surface to the pressure of the fluid on both sides, owing to the knife-edge support. Further, the valve fits loosely in its seat, so that there is practically no friction in its movement, and the leathers are adjusted so that their working portions extend into the space between the valve and its seat, and when the valve is in position to move there is no friction between the leathers and the moving parts. The valve also provides for the flow of the fluid to a certain extent without bodily moving the valve, the leathers yielding under slight pressure to permit the flow in one direction, while the pressure in the opposite direction forces the leathers in position to tightly close the valve.

What we claim is—

1. In a check-valve, the valve-body, a port in the valve-body, a valve fitting loosely in said port, and leathers arranged in the space between the valve and port and arranged to tightly close the port under pressure of fluid in one direction and to yield and provide a partial opening to the port without moving the valve under pressure in the other direction, substantially as described.

2. In a check-valve, the valve-body, a port in the valve-body, a valve fitting loosely in said port, a stem normally supporting the valve, the end of the stem on which the valve rests being provided with a knife-edge, an extension on the case to receive the valve-stem, and openings to permit free access of fluid beneath the valve-stem, substantially as described.

3. In a check-valve, the valve-body, a port in the valve-body, a balanced valve loosely fitting the port, a practically frictionless stem on the valve, and leathers arranged in the space between the valve and port, the upper edges of the leathers being adapted to yield under slight excess of pressure on one side to permit the passage of the fluid so that resistance is reduced to a minimum and only the weight of the valve has to be overcome to open the same, substantially as described.

In testimony whereof we have signed our names to this specification in the presence of two subscribing witnesses.

THOS. E. BROWN, JR.
R. H. THORPE.

Witnesses:
HENRY L. BRANT,
HUGO A. HENKEL.